Nov. 11, 1941.　　　W. K. ROBBINS　　　2,262,653
CHAIN REPAIR LINK
Filed May 27, 1940

Inventor:
William K. Robbins.
By: Brayton Richards
Attorney.

Patented Nov. 11, 1941

2,262,653

UNITED STATES PATENT OFFICE 2,262,653

CHAIN REPAIR LINK

William K. Robbins, Chicago, Ill.

Application May 27, 1940, Serial No. 337,476

2 Claims. (Cl. 59—85)

The invention relates to improvements in chain repair links, the construction of the present application constituting an improvement on that disclosed in my application, Serial No. 302,721, filed November 3, 1939, which has since resulted in Patent #2,216,831, dated October 8, 1940. The primary object of the invention is the provision of an improved link of the character indicated, which is capable of mechanical construction and highly efficient in use.

Another object of the invention is the provision of an improved repair link of the character indicated, which is so constructed and arranged that it may be largely manufactured or produced by forging operations.

Other objects will appear hereinafter.

The invention consists of the combination and arrangement of parts hereinafter described and claimed.

The invention will be best understood by reference to the accompanying drawing forming a part of this specification and in which—

Figure 1:
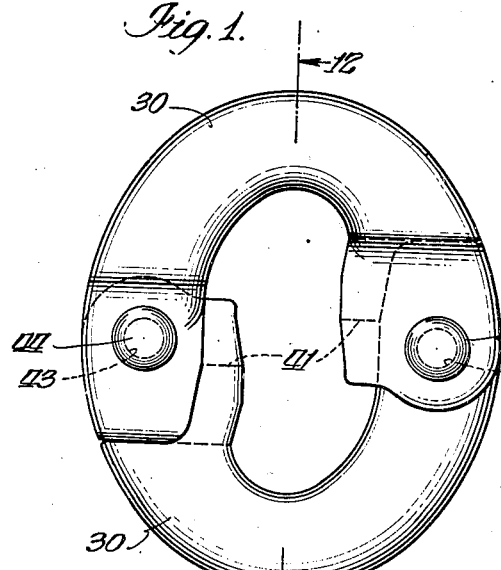
Figures 3, 4:
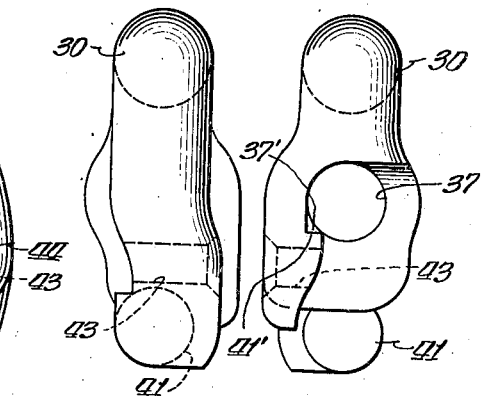
Figure 5:
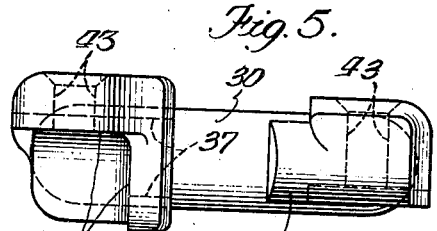
Figure 2:
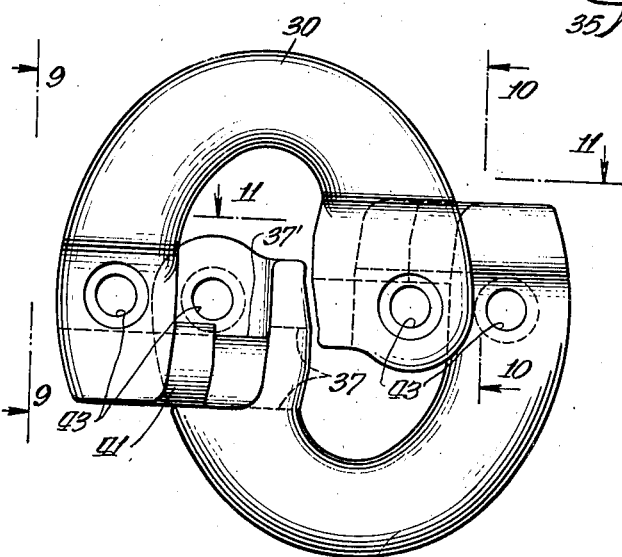

Figure 1 is a side view of a construction embodying the invention;

Figure 2, a side view illustrating the parts of said construction in positions for assembling the same;

Figure 3, an edge view of one of the link parts of said construction;

Figure 4, an edge view of the other side of said link part;

Figure 5, a top plan view of one of the link parts, and

Figure 6:
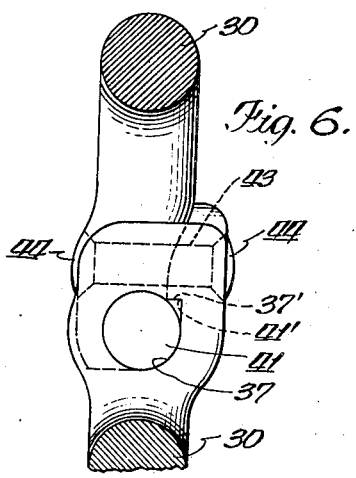

Figure 6, a section taken through one of the link parts.

The embodiment of the invention illustrated in the drawing comprises a repair link made in two substantially identical U-shaped halves 30, each half being provided with enlargements at its ends as shown. The enlargements are shown at each end by means of inward bulges on the inner edges of each of the link half ends and whereby sufficient metal may be provided in the link ends so that said link heads will have the same strength as the bodies of the link halves, notwithstanding certain perforations and distortions of the metal to be presently described.

Each link half 30 is provided with a socket 35 opening in one face and the outer edge of one link end, as indicated in Figures 3 and 5. The inner wall of the socket 35 is provided with a cylindrical perforation 37 which is continued through the walls of said socket to form a rounded channel 37' as indicated, said perforation 37 and channel 37' being preferably formed by a drilling operation after the socket 35 has itself been formed by means of a forging operation. A rivet hole 43 is also provided in each link end as indicated, said rivet hole being located as shown halfway in the end enlargement, and whereby sufficient metal is provided in the link half end so as to render the same substantially as strong as the body of the link half.

Each other link end is provided with a notch in the face of the link opposite to that in which the socket 35 is formed, and the other parts of the corresponding link end are shaped to provide abrupt shoulders 37' engaging similar shoulders 41' on the other link half and the cylindrical projection 41 fitting the perforation 37 so as to effect an interlocking connection between the link half ends when assembled, as indicated in Figures 1 and 2, which contain sufficient metal to give the interlocking parts substantially the same longitudinal strength as is possessed by the body of the link halves without necessitating any enlargement or bulging of the outer edges of the link halves. The link ends are also provided with registering rivet holes 43 to receive securing rivets 44 having upset and countersunk heads for securing said link ends to each other as shown.

By this arrangement a repair link is provided, the interlocking parts of which may be readily constructed largely by forging operations and which may be readily fitted together in interlocking engagement when desired. The smooth outer attachment of the contour of the link thus provided will permit the normal use of the chain without undue wear and without catching upon the guides or the like, thus adapting the repair link for use in chains on beef hoists, sheaves, pocketed wheels, or any similar uses, without interference or undue wear.

The arrangement disclosed provides joints for the link halves which are well adapted to resist the lateral bending thereof or shearing of the rivets. The specific form and arrangement of parts constitutes a simple and efficient construction for the purpose.

The link halves disclosed are what are termed in mechanics as "rights" and "lefts" but obviously may be made exactly identical by reversing the positions of the parts at one end thereof, as will be readily understood by those skilled in this art.

While I have illustrated and described the preferred form of construction for carrying the invention into effect, this is capable of variation and modification without departing from the spirit of the invention. I therefore do not wish to be limited to the precise details disclosed, but desire to avail myself of such modifications and variations as fall within the scope of the appended claims.

I claim:

1. A chain repair link comprising two link halves, each having a socket formed in one of its ends opening in one face and the outer edge thereof, the inner wall of said socket having a perforation, the other end of said link half being notched in its face and shaped to form a head interlocking with the socket in the other link half and provided with a projection fitting said perforation; and means for securing said interlocking ends to each other.

2. A chain repair link comprising two substantially identical U-shaped link halves, each being inwardly bulged at each of its ends and having a socket formed in one of its ends opening in one face and the outer edge thereof, the inner wall of said socket having a perforation, the other half of said link half being notched in its face and shaped to form a head interlocking with the socket in the other link half and provided with a projection fitting said perforation; and means for securing said interlocking ends to each other.

WILLIAM K. ROBBINS.